United States Patent [19]
Ovanin

[11] Patent Number: 4,909,521
[45] Date of Patent: Mar. 20, 1990

[54] CHUCK HAVING GRIPPING AND LOCATING SENSORS

[75] Inventor: George J. Ovanin, Euclid, Ohio

[73] Assignee: The S-P Manufacturing Corporation, Cleveland, Ohio

[21] Appl. No.: 371,531

[22] Filed: Apr. 26, 1982

[51] Int. Cl.⁴ .............................................. B23B 31/16
[52] U.S. Cl. ...................................... 279/1 R; 279/111
[58] Field of Search .................. 279/1 R, 111, 110, 15, 279/16, 1 H; 408/7, 12; 82/40 R, 28 R, 45, 21 A, 36 R; 51/165, 74; 269/303, 315, 23

[56] References Cited

U.S. PATENT DOCUMENTS

| | | | |
|---|---|---|---|
| 1,465,820 | 8/1923 | Hay | 79/119 |
| 1,974,249 | 9/1934 | Olson | 279/1 H |
| 2,402,273 | 6/1946 | Bogart . | |
| 2,420,855 | 5/1947 | Bogart | 279/1 H |
| 2,625,061 | 1/1953 | Mansfield | 269/23 X |
| 3,056,319 | 10/1962 | Thielenhaus | 82/45 X |
| 3,176,439 | 4/1965 | Gabriel et al. | 279/4 |
| 3,396,982 | 8/1968 | Sampson | 279/120 |
| 3,909,020 | 9/1975 | Yamano | 279/1 |
| 3,936,060 | 2/1976 | Hirao | 279/1 H |
| 3,945,275 | 3/1976 | Ovanin | 82/30 X |
| 3,984,114 | 10/1976 | Ovanin | 279/119 |
| 4,048,879 | 9/1977 | Cox | 82/2.5 X |
| 4,254,676 | 3/1981 | Wilson | 82/34 R |

FOREIGN PATENT DOCUMENTS

| | | | |
|---|---|---|---|
| 0138744 | 11/1979 | Fed. Rep. of Germany | 279/1 H |
| 2832351 | 1/1980 | Fed. Rep. of Germany | 279/111 |
| 0089504 | 6/1982 | Fed. Rep. of Germany | 279/1 R |

*Primary Examiner*—Z. R. Bilinsky
*Attorney, Agent, or Firm*—Watts, Hoffman, Fisher & Heinke

[57] ABSTRACT

An improved pull-back chuck is disclosed that detects when a workpiece is properly located against a locating surface of the chuck and when the workpiece is gripped with sufficient force by the jaws. A transducer is disposed within a master jaw in a portion deformable by operating levers of the chuck assembly. When sufficient force is applied to the workpiece by action of the operating levers, a portion of the master jaw deforms causing the transducer to deform and modify an electrical signal in proportion to the pressure. A switch located in an aperture of a locating plate has an actuator that protrudes beyond the locating surface of the locating plate. When a reference surface of the workpiece abuts the locating surface of the locating plate of the chuck, the actuator is depressed by the workpiece and the switch changes electrical condition giving an indication of abutment.

7 Claims, 3 Drawing Sheets

CHUCK HAVING GRIPPING AND LOCATING SENSORS

TECHNICAL FIELD

The present invention relates to chucks and is particularly directed to a rotary pull-back chuck that senses the gripping force on a workpiece and contact of the workpiece with a locating surface of the chuck.

BACKGROUND ART

Rotary chucks with radially movable jaws for gripping work located at the rotary axis of the chuck are commonly used for machining operations. The jaws are moved through various types of internal mechanisms, for example, bell-crank type levers of which one arm engages the back of a movable jaw and the other cooperates with an axially movable lever actuator. Typically, the actuator is moved with a draw rod or tube connected through the back of the chuck and actuated by a hydraulic cylinder.

A universal chuck of lever-actuated pull-back type is disclosed in U.S. Pat. No. 3,396,982 owned by the assignee of the present application. This type of lever-actuated chuck provides high gripping forces and is therefore advantageously used where a heavy workpiece is to be held or where high speed or heavy cutting or both are employed. In the chucking operations for which this type of chuck is used, it is necessary that the workpiece be positioned with a reference surface of the workpiece against a transverse, i.e., radial, locating surface of the chuck. The chuck is constructed to pull the workpiece back after it is gripped to place the reference and locating surfaces into abutment. The prior art devices, however, do not provide any assurance or indication that the workpiece and the locating surface have in fact come into abutment.

Apart from proper location of the workpiece, adequate work-gripping force must be assured. As rotary machining speeds increase to reduce machining time, it becomes more important but also more difficult to maintain sufficient gripping force, because centrifugal force tends to open the jaws. By sensing the gripping force, a determination can be made that the workpiece is adequately gripped for the rotational and cutting forces involved.

DISCLOSURE OF THE INVENTION

The present invention provides a new and improved chuck in which the force applied to the work-gripping jaws is sensed. The invention particularly relates to a rotary pull-back chuck and includes a provision for sensing when a workpiece reference surface is in abutment with a locating surface of the chuck. To facilitate force sensing, the chuck of the present invention has a transducer, operatively connected to a jaw, that changes electrical characteristics when the jaw is urged against a workpiece with a predetermined force.

In a preferred embodiment, a transducer, strain gage or load cell is disposed in a deformable portion of at least one master jaw of the chuck. An operating lever of the chuck acts against the deformable portion of the master jaw in which the transducer is disposed. During the gripping of the workpiece, a lever actuator rotates the operating lever. The rotation of the operating lever moves the master jaws and attached work gripping jaws radially inward to grip the workpiece. After the workpiece is engaged, the lever actuator continues to act on the operating lever drawing the chuck body and gripped workpiece rearwardly relative to a fixed locating surface at the face of the chuck, until the workpiece is located against the surface. Continued force on the operating lever slightly deforms the portion of the master jaw in which the transducer is disposed, causing the transducer to deform and change its electrical characteristics. This change is indicative of gripping force. Particular structural features of the chuck facilitate the transducer and its electrical communication with control circuits external to the chuck.

The present invention includes provision for producing an electrical signal when the workpiece has contacted the locating surface. In a preferred embodiment, a switch is located within a hole that opens through the locating surface with a switch actuator protruding beyond the locating surface. When the chuck pulls the workpiece against the locating surface, the workpiece contacts the actuator and activates the switch.

Advantageously, the machine tool with which the chuck is used is provided with an interlock control that prevents spindle rotation in the absence of both an indiction of a predetermined gripping force from the transducer and activation of the switch at the locating surface.

The above and other features and advantages of the invention will be better understood from the following detailed description and accompanying drawings.

BRIEF DESCRIPTION OF THE DRAWINGS

FIG. 4 is a partial front elevation view taken along line 4—4 of FIG. 1.

BEST MODE FOR CARRYING OUT THE INVENTION

Figure 1:
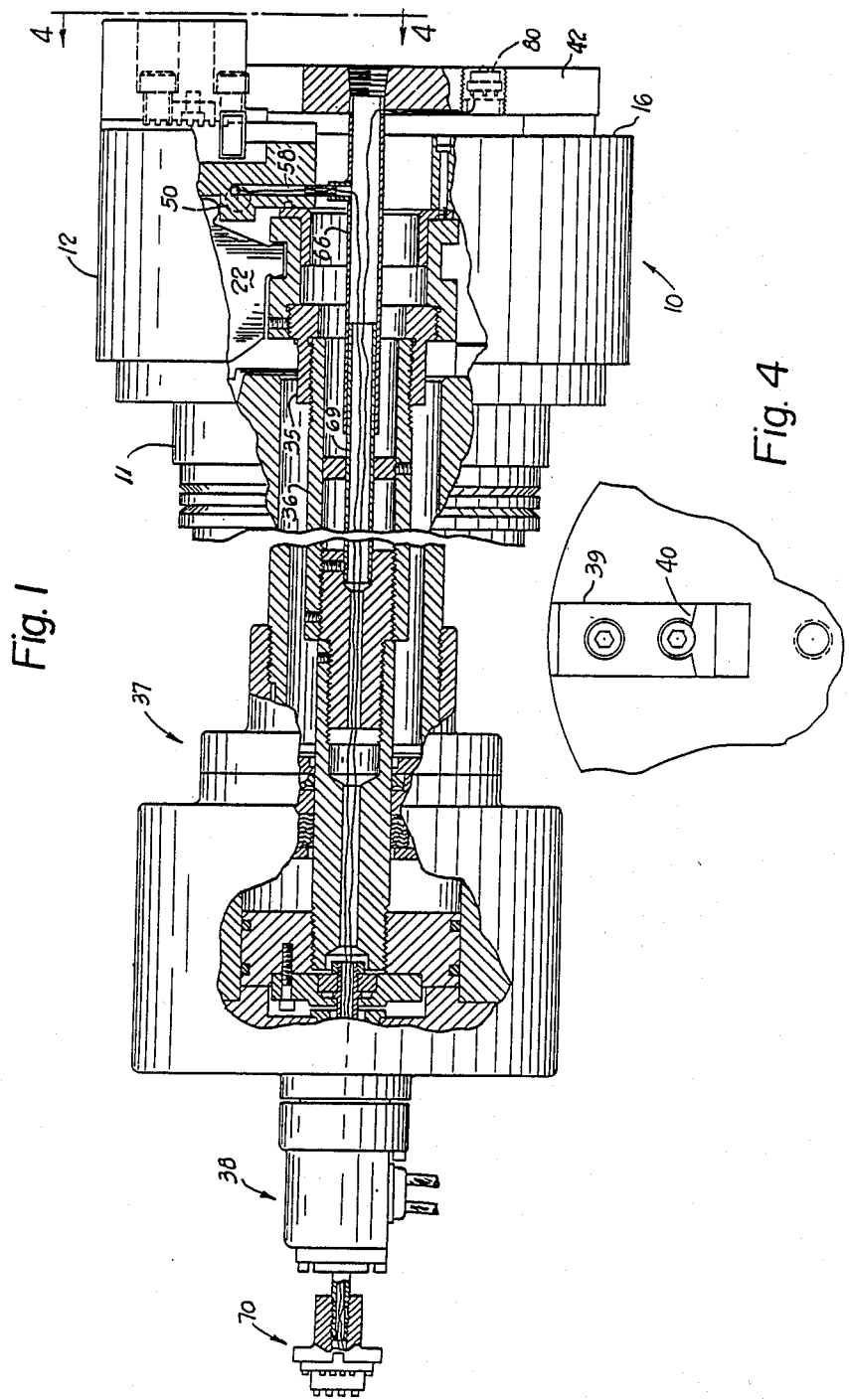
FIG. 1 is a side elevation view, partially in section, of a rotary chuck incorporating the present invention.
Figure 2:
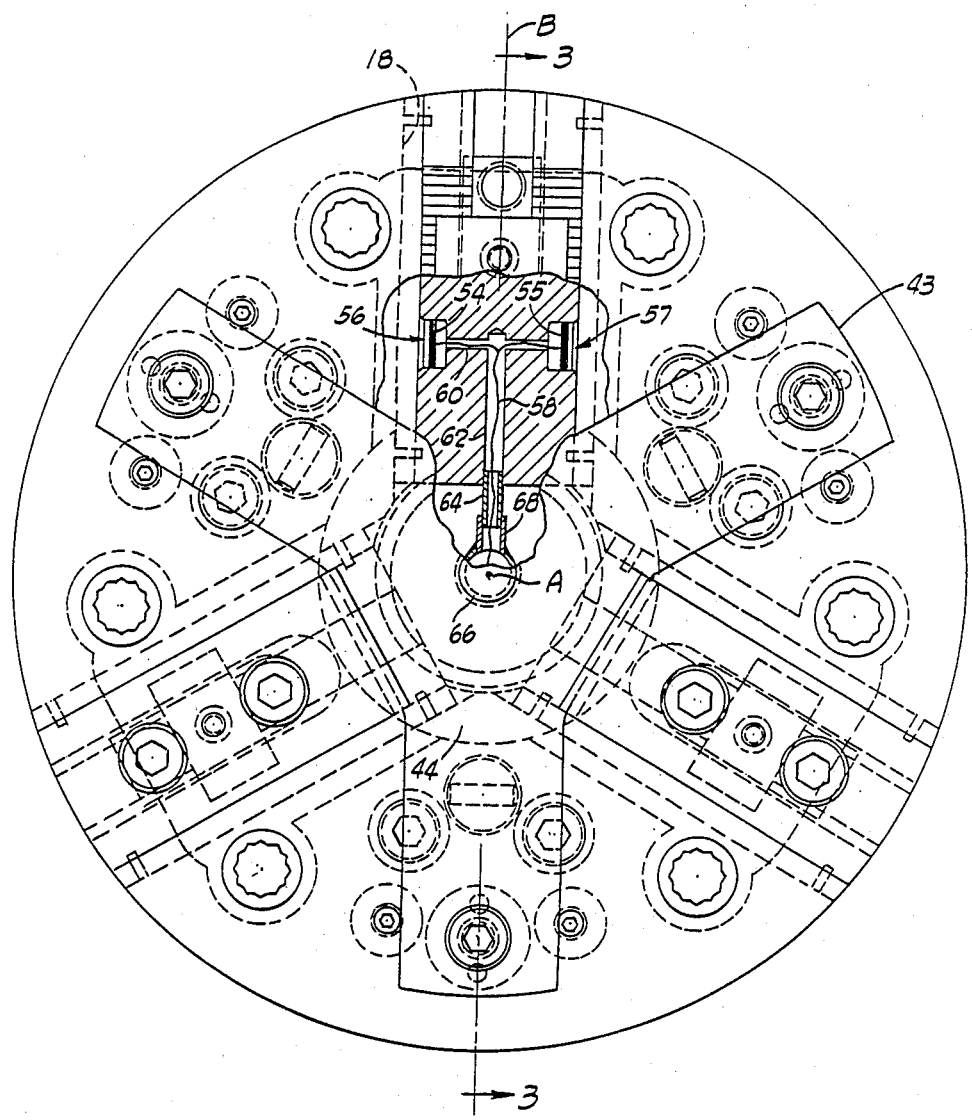
FIG. 2 is a front elevation view, partially in section, of the rotary chuck of FIG. 1.

As shown in the accompanying drawings, a chuck 10 embodying the invention is adapted to be mounted onto a rotary spindle 11 of a suitable machine tool. The chuck 10, having a cylindrical body 12, is a universal chuck of the type known in the art as a pull-back chuck. Three master jaws 14 extend radially from a central axis A of the chuck body and are disposed equiangularly about the axis in the front face 16 of the chuck. The jaws 14 are movable in ways 18, toward and away from the central axis A.

The chuck has cavities 20 in which operating levers 22 are disposed. Each of the operating levers are similar in structure and therefore only one such operating lever will be described. The lever 22 is mounted in the cavity 20 about a lever pin 24. A short arm 26 of the operating lever 22 extends into a receiving notch 28 of the back of a master jaw 14. Rotation of the operating lever 22 about the lever pin 24 forces the master jaw 14 toward or away from the central axis A.

The chuck 10 has a lever actuator 30 located within the central cavity 21. A long arm 32 of the operating lever 22 extends into a receiving notch 34 of the lever actuator 30, which is coupled through a coupling 35 to a draw tube 36. The draw tube 36 is actuated axially by a rotary hydraulic cylinder 37 which is mounted at the rear end of spindle 11 and rotates with the spindle.

Hydraulic fluid is provided through a rotary union 38 to the cylinder 37 to provide the axial motion of the draw tube 36. As will be apparent to those skilled in the art, rotation of the operating lever 22 about the lever pin 24 is effected by the axial motion of the lever actuator 30 which is in turn controlled by the axial motion of the draw tube 36. Rotation of the operating lever 22 forces the associated work gripping jaw 39 carried by the master jaw 14 into and out of engagement with the workpiece (not shown). The workpiece is gripped by a surface 40 of the gripping jaw 39. In the preferred embodiment shown, the lever 22 has an enlarged portion 41 that provides substantial mass at a location that acts counter to the jaw-opening effect of centrifugal force on the jaws from chuck rotation. Levers of this construction are disclosed in more detail in U.S Pat. No. 3,984,114 to Ovanin, which is owned by the assignee of the present application and is hereby fully incorporated herein by reference.

The chuck 10 has a workpiece locating plate 42, which is a spider-shaped, fixed plate which has three spider portions or legs 43 extending from a central portion 44 at locations equiangularly spaced from each other approximately 120° about the periphery of the central portion 44.

Figure 3:
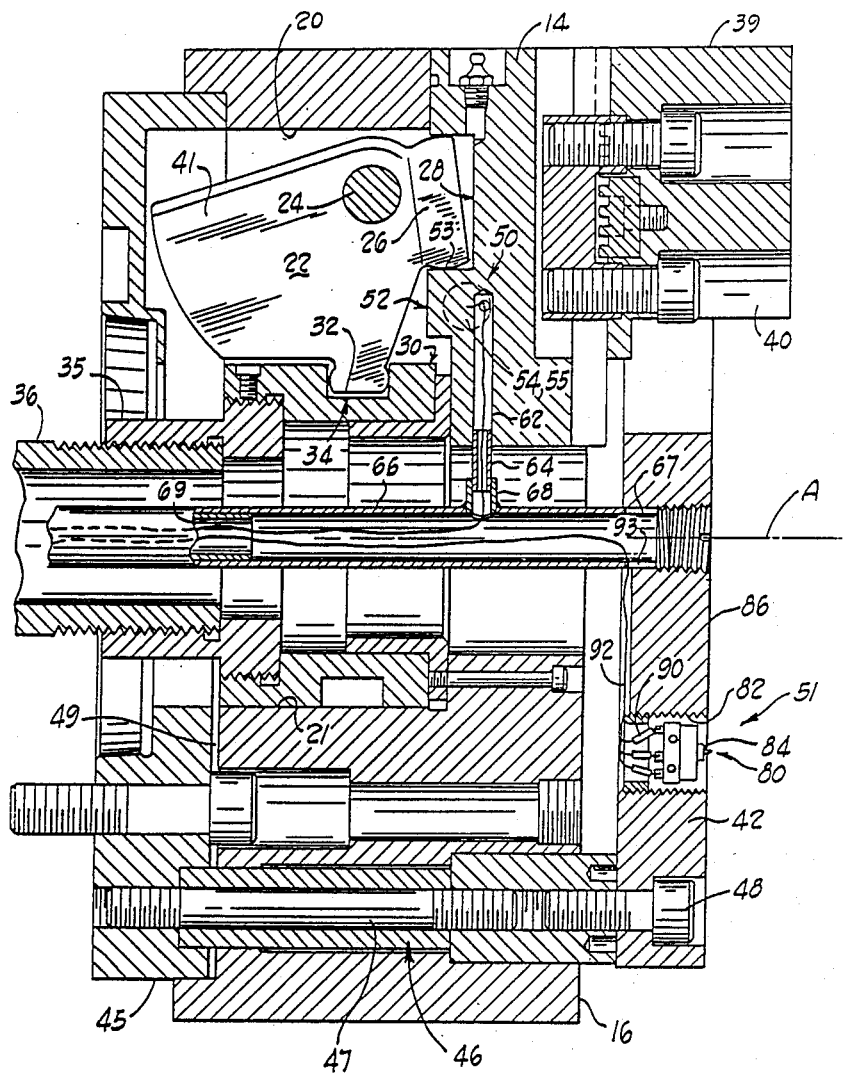
FIG. 3 is a sectional view taken along line 3—3 of FIG. 2.

A detailed explanation of the workings of a pullback chuck is disclosed in U.S. Pat. No. 3,396,982 to Sampson, which is owned by the assignee of the present application and is hereby fully incorporated herein by reference. Briefly, a mounting plate 45 is secured to the spindle and carries three, axially extending, two-piece guide rods 46, on which the chuck body slides. Each guide rod 46 is secured to the mounting plate 45 by a rod 47 threaded at both ends. The locating plate is attached to each rod 46 by a machine screw 48. The rods support the locating plate 42 in front of the chuck body and carry the chuck body in rotation with the spindle. The chuck body is biased toward the locating plate, to the position shown in FIG. 3, by springs (not shown) producing a small gap 49 between the body and the mounting plate.

In operation, a workpiece (not shown) is placed in juxtaposition with the locating plate 42. The draw tube 36 draws the lever actuator 30 axially toward the rear of the chuck body 12, thus rotating the operating levers 22, about the lever pins 24. The master jaws 14 are forced radially inwardly toward the central axis A by the short arm 26 having a camming action within notch 28 of the master jaws. Once the master jaws 14 have fully engaged the workpiece, continued drawing or axial motion of the lever actuator 30 toward the rear causes the jaws and the workpiece to move rearward with respect to the locating plate 42. The workpiece is drawn or pulled-back into abutment with the locating plate 42. The jaws and supporting chuck body can move rearward with respect to the locating plate 42 a maximum distance defined by the gap 49.

The present invention provides an improvement over the standard pull-back chuck such as disclosed in U.S. Pat. No. 3,396,982 by providing a first sensing device 50 for sensing the gripping force transmitted through the master jaws onto the workpiece and a second sensing device 51 for sensing when the workpiece reference surface is in abutment with the locating plate 42.

The first sensing device 50 is a transducer, strain gage or load cell located within the master jaw located to sense distortion of the master jaw by the operating lever when work-gripping force is applied. In the preferred embodiment shown, the master jaw has a rearward extending, deformable portion 52 that forms a drive surface 53 of the notch 28, against which the lever arm 26 acts when the master jaw is moved to a work-gripping position. Two transducers 54, 55 are located adjacent the surface 53 of the notch 28, each in a cavity 56, 57 of the master jaw on an opposite side of the longitudinal center line B of the master jaw. Transducers thus disposed will average minor discrepancies in the forces over the work-gripping jaw surface when indicating the force applied. Because all the jaws of the chuck apply uniform force and center the workpiece, transducers are provided in only one master jaw.

The transducers are of the type known in the art as a Wheatstone bridge which has four resistor legs positioned in one plane. The resistance value of at least one of the legs changes as a function of the deformation of the plane. These type of transducers can be balanced to give a desired electrical output signal when they are not stressed. Once the transducers are stressed, the electrical characteristics of their respective output signals will change as a function of the amount of stress. Preferably, each transducer is oriented in its cavity so the plane defined by the transducer resistor components is parallel with the ways 18.

Electrical wires 58 are operatively connected to each of the transducers 54, 55 and are fed through a first transverse wire passageway 60 into a second radially extending wire passageway 62, both in the master jaw. A passageway extension tube 64 is fit within the wire passageway 62 and extends centrally of the chuck from the radially inward end of the master jaw. A main wire conduit 66 within the chuck body is coaxially aligned with the central axis A of the chuck 10, and fits into a receiving hole 67 in the back of the locating plate 42. A short receiving tube 68 projects from and normal to the main wire conduit 66, positioned and aligned to receive the extension tube 64. The tube 64 is telescoped into the receiving tube 68. This accommodates motion of the master jaw and passageway 62 perpendicular to the central axis A while providing closed communication between the wire passageway 62 and the conduit 66. A second conduit 69 is telescoped into the conduit 66 at the rearward end. The wires extend through the conduits 66, 69 toward the rear of the machine tool to an electrical rotary connector 70 of the slip-ring type, from which the electrical output signal from the transducer can be monitored when a workpiece is gripped. If desired, monitoring can be continuous during chuck operation.

The conduit 66 is secured in the chuck body so that when the chuck body is pulled-back during the chucking operation, the conduit moves commensurate with the axial motion of the chuck body. The passageway 62 and the receiving tube 64 also move rearward with the axial motion of the chuck body. The conduit 66 slides within the hole 67 of the locating plate 42.

As the draw tube 36 first begins to move axially rearward, the conduit 69 moves with the draw tube and the conduit 66 remains stationary with the chuck body. The master jaw 14 moves radially inward and tube 64 moves further into the receiving tube 68. After the chuck grips the workpiece and the pull-back action begins, the chuck body moves rearward and the conduits 66, 69 move together axially rearward.

The present invention also produces an electrical signal when a reference surface of the workpiece has contacted the workpiece locating plate 42. A switch 80 is located within an aperture 82 of a leg 43 of the workpiece locating plate 42. Preferably each of the legs 43 will have a locating detection switch 80. Since all are identical, only one such switch will be described in detail. The switch 80 has an actuator 84, which extends adjustably slightly beyond a locating surface 86 of the workpiece locating plate 42. The switch 80 is of the type that has one electrical characteristic when the actuator 84 is not depressed and a different electrical characteristic when the actuator 84 is depressed. In the preferred embodiment, the switch is conductive when the actuator is depressed and non-conductive otherwise. Wires 90 from the switch run through a wire passageway 92 at the rear of the locating plate 42. The wire passageway 92 is in communication with the main wire conduit 66 through an opening 93.

The locating plate 42 remains stationary when the chuck body moves rearward during the pull-back operation. The opening 93 is adapted to permit continuous communication between the passageway 92 and the conduit 66 even during the axial, rearward motion of the conduit 66. Wires from the switch 80 extend through the main wire conduit 66 to the connector 70 and the condition of the switch 80 can be monitored through the connector 70, continuously if desired.

In operation, the draw tube 36 and lever actuator 30 rotate the operating levers about pins 24 forcing the master jaws 14 inward so the work-gripping jaws 39 grip a workpiece. The chuck body and workpiece are then moved rearwardly with respect to the locating plate 42 to pull a reference surface of the workpiece back against the locating surface 86 of the locating plate 42. Once the workpiece reference surface is in abutment with the surface 86 of the locating plate 42, the actuator 84 of switch 80 will be depressed by the workpiece, thus changing the electrical characteristics of the switch 80. This change in electrical characteristics of the switch 80 can be monitored at the connector 70. The draw tube 36 continues to apply force to the operating levers 22 and thus the master jaws 14 to grip the workpiece with more force. For example, a work-gripping force of 12,000 pounds may be applied. Such force will cause the extension portion 52 of the master jaw to deform slightly thus deforming the transducers 54, 55 located within the cavities 56 and 57. The amount of deformation of the transducer and thus the changed electrical characteristics of the transducer is proportional to the force applied and is monitored as an electrical signal at the connector 70.

It is contemplated that an interlock control apparatus will be operatively connected to the connector 70 and controlled by the signals to prevent spindle rotation unless the reference surface of the workpiece has abutted the locating surface 86 of the locating plate 42 and a predetermined gripping force is applied. Once both of these conditions have been met, the spindle can be rotated.

Possible modifications and variations of the invention will be apparent to those skilled in the art from the foregoing detailed disclosure. Therefore it is to be understood that within the scope of the appended claims the invention can be practiced otherwise than as specifically shown and described.

I claim:

1. In an improved rotary pull-back chuck having a rear mounting plate, a generally cylindrical chuck body having a front face, a plurality of radially movable master chuck jaws and attached work gripping jaws for holding a workpiece, a plurality of jaw operating levers within the chuck body, one associated with each jaw, to move the jaws radially relative to the chuck body, means within the chuck body to operate the levers to move the jaws, a radially disposed work locating surface spaced from the front face of the chuck, and means for mounting the work locating surface to the rear mounting plate, said chuck body being permitted to axially move along the locating surface mounting means with respect to said rear mounting plate, the improvement comprising:

a transducer that changes its electrical characteristics when physically deformed and disposed within the chuck and located in a portion of a master jaw deformable by at least one of said operating levers when a workpiece is gripped with a predetermined force by said work gripping jaws, said transducer being deformed by deformation of said master jaw; and means for detecting when a workpiece gripped by the jaws abuts said location surface.

2. The improved rotary pull-back chuck of claim 1 wherein said means for detecting is a switch that changes condition when a workpiece abuts said locating surface.

3. The improved rotary pull-back chuck of claim 2 further including a first wire passageway axially aligned with a center axis of the chuck body, a second wire passageway in communication with said first wire passageway and said switch and a telescoping wire passageway in communication with said first wire passageway and said transducer, wires extending from said transducer and said switch to a connection terminal located rearward of the chuck body.

4. The improved rotary pull-back chuck of claim 3 wherein said first wire passageway and said telescoping wire passageway are adapted to move with the axial movement of said chuck body.

5. The improved rotary pull-back chuck of claim 4 wherein said first wire passageway is adapted to remain in communication with said second wire passageway during said axial motion of said first wire passageway.

6. In an improved rotary chuck of the type having a generally cylindrical chuck body, a plurality of radially movable master chuck jaws and attached work gripping jaws for holding a workpiece, a plurality of jaw operating levers within the chuck body, and means within the chuck body to operate the levers to move the jaws, the improvement comprising:

at least one transducer within the chuck, located in a portion of a master jaw deformable by at least one of said operating levers when a workpiece is gripped with a predetermined force by said work gripping jaws, said transducer being deformed when said portion of the master jaw deforms; and a first wire passageway aligned with a center axis of the chuck body, a receiving tube projecting radially from the first passageway, a second wire passageway in communication with said first passageway and said transducer, an extension tube fixed to the master jaw in which said transducer is located and telescoping into said receiving tube permitting continuous, unbroken communication between said first and second passageways during jaw motion, and electrical wires operatively connected to said transducer and extending through said second wire passageway into and through said first wire passageway to a connection terminal located rearward of the chuck body.

7. In an improved rotary chuck of the type having a generally cylindrical chuck body, a plurality of radially movable master chuck jaws and attached work gripping jaws for holding a workpiece, a plurality of jaw operating levers within the chuck body, and means within the chuck body to operate the levers to move the jaws, the improvement comprising:

two transducers that change electrical characteristics when physically deformed, said transducers being located within the chuck body in a portion of a master jaw deformable by at least one of said operating levers when a workpiece is gripped with a predetermined force by said work gripping jaws and located so one transducer is on each side of a centerline of said master jaw, said transducers being deformed when said portion of the master jaw deforms, the changes in electrical characteristics of the two transducers being indicative of an average gripping force on opposite sides of the centerline, a first wire passageway aligned with a center axis of the chuck body, a receiving tube projecting radially from the first passageway, a second wire passageway in communication with said first passageway and said transducers, said second passageway including an extension tube fixed to the master jaw in which said transducers are located and telescoping into said receiving tube permitting continuous, unbroken communication between said first and second passageway during jaw motion, and electrical wires operatively connected to said transducers and extending through said second wire passageway into and through said first wire passageway to a connection terminal located rearward of the chuck body.

* * * * *